Nov. 8, 1932.  F. KUHN ET AL  1,886,558
TOASTER
Filed July 8, 1929   2 Sheets-Sheet 1

INVENTORS
Frank Kuhn
Laurence H. Thomas
BY
ATTORNEYS

Nov. 8, 1932.  F. KUHN ET AL  1,886,558
TOASTER
Filed July 8, 1929  2 Sheets-Sheet 2
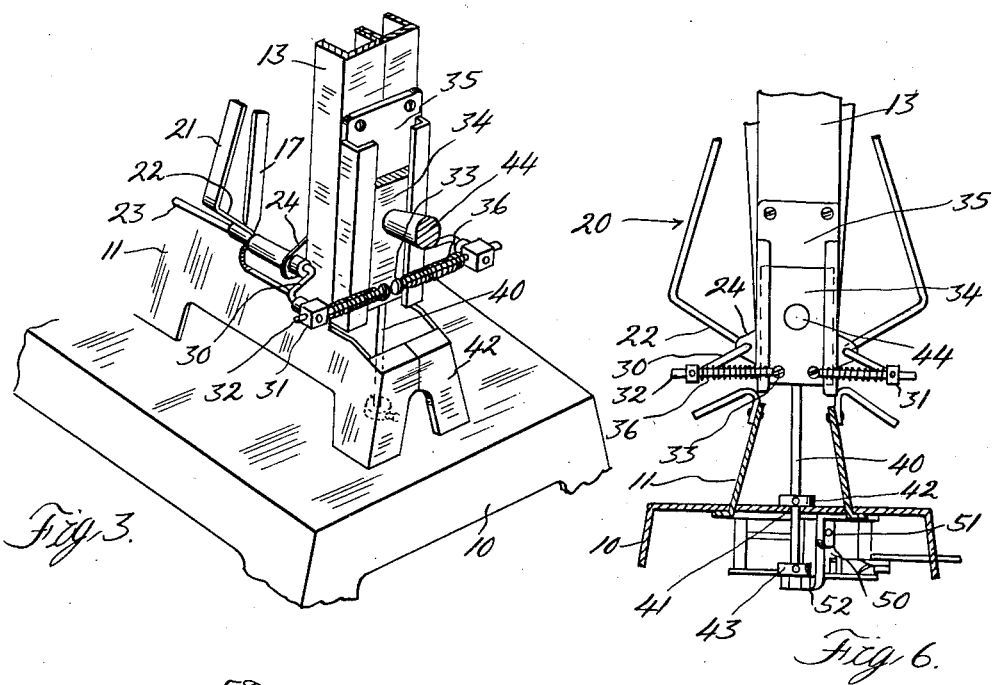
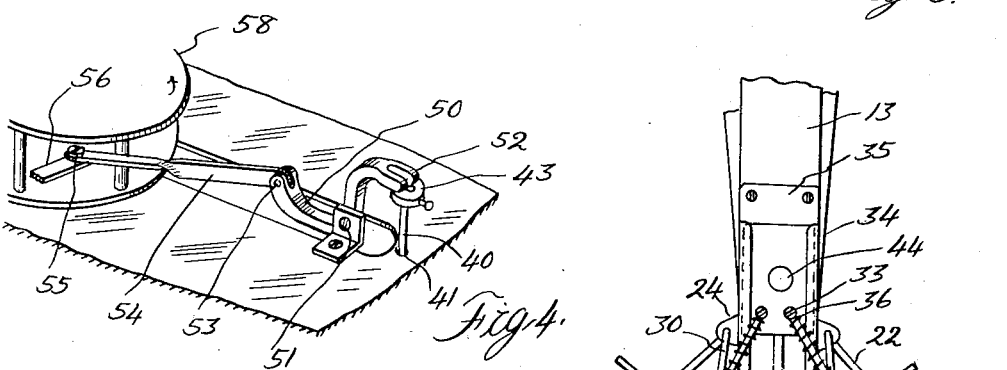
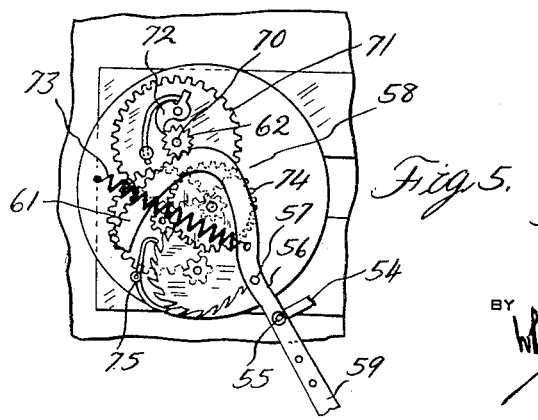
INVENTORS
Frank Kuhn
Laurence H. Thomas
ATTORNEYS Patented Nov. 8, 1932

1,886,558

UNITED STATES PATENT OFFICE

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN

TOASTER

Application filed July 8, 1929. Serial No. 376,690.

This invention relates to toasters and has particular reference to an electric toaster in which the toast is automatically moved away from the heating element when the toasting operation is completed.

One of the primary objects of the invention is to provide a toaster of the above mentioned character which will include toast holders, means for retaining the toast holders in toasting position, and means operable after a predetermined time interval to move the toast holders to non-toasting position.

The invention further contemplates the provision of a toaster of the above mentioned character in which the toast holders may be moved to toasting position and the automatic releasing mechanism may be set with a single operation.

Other objects and advantages of the invention will become more apparent as the following description proceeds, particularly when reference is had to the accompanying drawings, wherein Figure 1 is a side elevational view of a toaster constructed in accordance with the teachings of this invention;

Figure 3 is a fragmentary perspective view of a portion of the toaster, showing the actuating mechanism for the toast holders;

Figure 4 is a fragmentary perspective view of a second portion of the actuating mechanism;

Figure 5 is a plan view of the clock work mechanism forming a part of the actuating mechanism;

Figure 6 is an end elevational view of the toaster, partly in section, showing the toast holders in toasting position, and Figure 7 is a view similar to Figure 6 showing the toast holders in non-toasting position.

Figure 1:
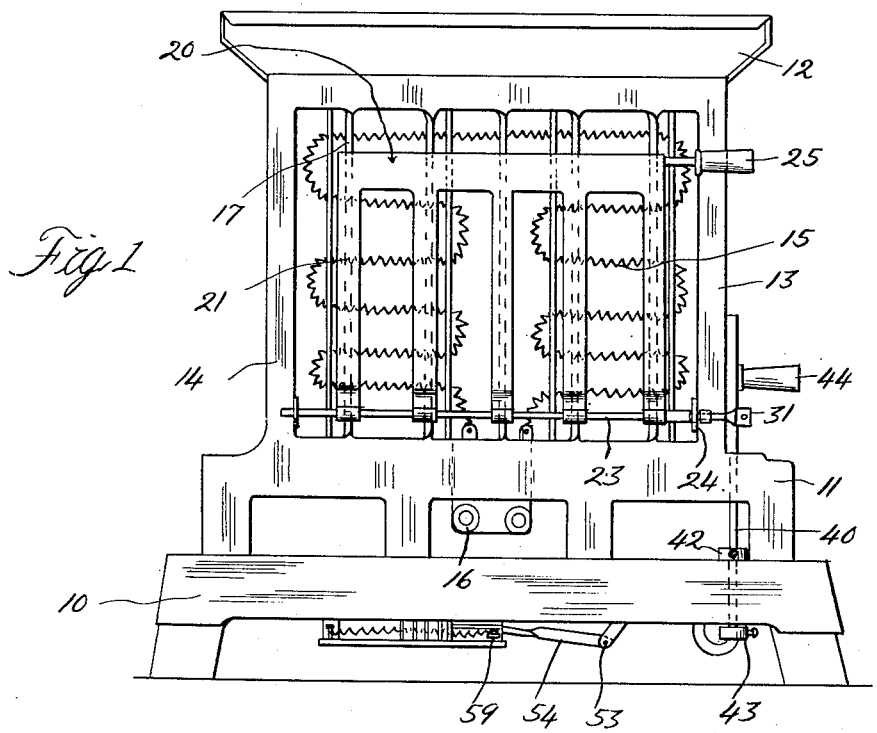
Figure 2:
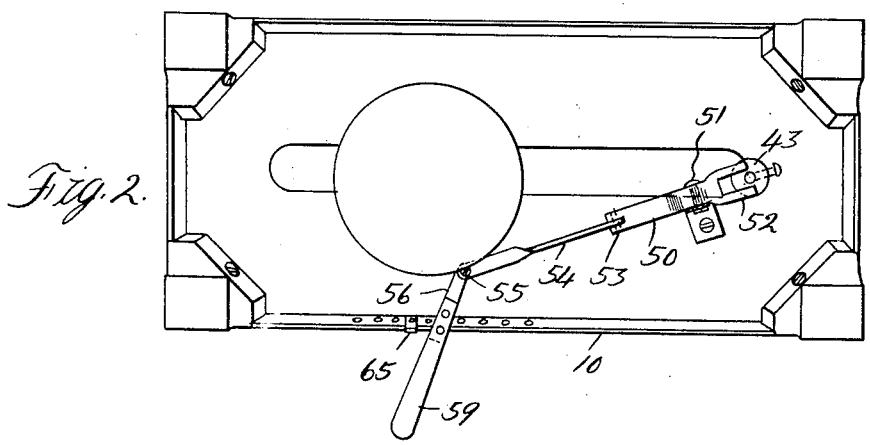
Figure 2 is a bottom plan view of the toaster shown in Figure 1.

In the drawings wherein like reference characters designate corresponding parts throughout all views there is disclosed a toaster including a base 10 and a frame work supported on the base and including the lower platform 11, an upper platform 12 and end plates 13 and 14 respectively. Supported vertically within the frame work is a heating element 15 provided with the terminals 16 for connection to a suitable source of electric current. Arranged on opposite sides of the heating element are guides 17, which may, as illustrated, be formed integral with the upper and lower platforms, these guards forming supports against which the bread slices are adapted to be clamped during the toasting operation.

Fulcrumed on each side of the toaster frame work is a toast holder 20 and each toast holder includes a plurality of fingers 21 integrally connected at their top and bent inwardly at their lower ends to form a supporting base 22. At their lower extremities the fingers are fixed to a shaft 23 and this shaft is rotatably mounted in ears 24 projecting laterally from the end plates 13 and 14 of the frame work. Thus each toast holder is fulcrumed about the axis of its respective shaft 23 whereby it may be moved toward or away from the heating element to toasting or non-toasting positions. As illustrated in Figure 1 of the drawings each toast holder may be provided with a handle 25 adjacent its upper end whereby the same may be manually moved toward or away from the heating element.

To provide means for actuating the toast holders, each shaft 23 is bent at its one end to form a lever arm 30 it being noted that each lever arm is adapted to move about the axis of its respective shaft as a fulcrum. The free end of each lever arm is fixed to a collar 31 sleeved on a link 32 and each link 32 is pivotally mounted as at 33 on a slide 34 mounted for vertical movement in a guideway 35 carried by the end plate 13. Sleeved on each link is a spring 36 which engages at its one end the anchor or pivot point 33 of its respective link and engages at its other end the collar 31, thus acting to constantly urge the lever arm about its fulcrum.

The vertical movement of the slide 34 permits movement of the pivot points 33 to opposite sides of the fulcrums of the levers 30, thus causing the springs 36 to act on opposite sides of the said fulcrums. Thus with the slide 34 in its uppermost position as illustrated in Figure 7 of the drawings, the springs 36 act downwardly on the lever arms to move the toast holders to non-toasting position. When, however, the slide 34 is depressed to the position shown in Figure 6 of the drawings the springs 36 act outwardly on the lever arms to urge the toast holders to toasting position. Further it will be noted that the toast holders will be moved to either toasting or non-toasting position with a snap movement as the pivot points 33 move past the fulcrums of the levers and that further the toast holders will be yieldably retained in toasting position whereby they may be manually moved away from the heating element, even when the slide is depressed, to permit inspection of the bread slices and may also automatically adjust themselves to bread slices of different thicknesses.

The slide 34 is provided with a depending arm 40 which projects through an opening 41 in the base 10. Adjustably fixed on the arm 40 are the collars 42 and 43 respectively adapted to engage the upper and lower faces of the base 10 to limit vertical movement of the slide. A handle 44 fixed to the slide and projecting laterally therefrom provides means for manually moving the slide to either of the positions above described.

The invention contemplates the provision of means for moving the slide 34 from its depressed position to its elevated position after a predetermined time interval and to thus move the toast holders to non-toasting position after they have been in toasting position for a predetermined length of time. To accomplish this there is provided a bell crank lever 50 pivoted as at 51 to the under side of the base 10. At its one end this bell crank lever is provided with the extension 52 arranged in the path of vertical movement of the arm 40 and at its other end the bell crank lever is pivotally connected as at 53 to a link 54. The link 54 is pivoted as at 55 to a lever 56 which is pivotally mounted as at 57 within a clock work mechanism designated generally by the reference character 58. The lever 57 is provided at its one end with the handle portion 59 by which the same may be manually moved about its pivot and is provided at its other end with a rack segment 61 adapted for engagement with a pinion 62 of the clock work mechanism. The handle portion of the lever projects laterally beyond the base 10 and a lug 65 is adjustably fixed to the side of the base to form a stop for limiting movement of the lever about its pivot. While the stop may be adjustably mounted in any desired manner it may, as illustrated, be adapted for engagement in any one of a series of openings 66 formed in the side of the base, these openings being calibrated if desired to indicate the time at which the lever will be returned to its original position.

The clock work mechanism includes the pinion 62 fixed to a shaft 70. Rotatably mounted on this shaft is a gear 71 locked for rotation with the pinion 62 by a spring pressed pawl 72 when the pinion is rotated in the direction of the arrow in Figure 4 of the drawings. A spring 73 tends to return the lever 56 to its original position and, during this movement of the lever, the gear 71 is locked for rotation with the pinion 62. The gear 71 is connected by a train of gearing 74 to an escapement mechanism designated generally by the reference character 75 whereby rotation of the gear 71 and return of the lever to its original position is retarded. Thus the lever may be manually moved about its pivot against the tension of the spring 73 until it engages the stop 65 after which it may be released, whereupon the spring 73 will return the lever to its original position, this return of the lever, however, being retarded by the clock work mechanism. As the lever returns to its original position the bell crank lever 50 will be moved about its pivot by the link 54, thus causing the portion 52 of this lever to force the arm 40 and slide 34 upwardly. Obviously when the slide 34 has been moved upwardly a sufficient distance to move the pivot points 33 above the fulcrums of the lever arms 30, the springs 36 will function to move the toast holders to non-toasting position.

From the above it is believed that the structure and operation of the invention will be clearly apparent. With the toast holders in non-toasting position, bread slices will be placed on the flanges 22 of the toast holders and the slide 34 will then be depressed by the handle 44 to cause the springs 36 to force the toast holders to toasting position. When the slide 34 is depressed, the collar 43 will engage the portion 52 of the bell crank lever to rock the bell crank lever about its pivot, thus moving the lever 56 until the latter engages the stop 65. Thus, the single operation of depressing the slide 34 moves the toast holders to toasting position and sets the clock work mechanism although it will be readily apparent that if desired, the clock work mechanism may first be set by a manual actuation of the lever 56 and that the slide 34 may then be depressed until its collar 43 engages the bell crank lever.

In any event during the toasting operation the slide 34 will be depressed, the toast holders being resiliently held in toasting position and the collar 43 being in engagement with the bell crank lever. The lever 56 will be slowly returned to its original position thus slowly rocking the bell crank lever about its pivot to slowly move the slide 34 upwardly. When the slide 34 has been moved upwardly a sufficient distance to move the pivot points 33 beyond the fulcrums of the lever arms 30, the springs 36 will function to move the toast holders to non-toasting position. Obviously the collars 42 and 43 may be adjusted on the arm 40 to vary the limits of vertical movement of the slide 34 while the stop 65 may be adjusted to limit the movement of the lever 56 about its pivot and to thus vary the time interval at which the lever will be returned to its original position and the toast holders will be moved to non-toasting position.

What we claim as our invention is:

1. In a toaster, a toast holder, and means for moving said toast holder to toasting and non-toasting positions, said means including a yieldable member operable in one position to urge said toast holder to toasting position and operable in a second position to urge said toast holder to non-toasting position, means for moving said yieldable member to one of said positions, and means for slowly returning said yieldable member to the other of said positions.

2. In a toaster, a toast holder movable to toasting and non-toasting positions, a yieldable member connected to said toast holder operable in one position to urge said toast holder to toasting position and operable in a second position to urge said toast holder to non-toasting position, a slide mounting said yieldable member, and means for moving said slide to move said yieldable member from one of said positions to the other of said positions.

3. In a toaster, a toast holder movable to toasting and non-toasting positions, a yieldable member connected to said toast holder operable in one position to urge said toast holder to toasting position and operable in a second position to urge said toast holder to non-toasting position, a slide mounting said yieldable member, means for moving said slide in one direction to move said yieldable member to one of said positions, and means for slowly moving said slide in the opposite direction to slowly return said yieldable member to the other of said positions.

4. In a toaster, a toast holder movable to toasting and non-toasting positions, a yieldable member connected to said toast holder operable in one position to urge said toast holder to toasting position and operable in a second position to urge said toast holder to non-toasting position, a slide mounting said yieldable member, means for moving said slide in one direction to move said yieldable member to one of said positions, and means for slowly moving said slide in the opposite direction to slowly return said yieldable member to the other of said positions, said last mentioned means including a spring operable to move said slide in the last mentioned direction and clock work mechanism retarding movement of said slide by said spring.

5. In a toaster, a toast holder, a fulcrum for said toast holder, a resilient member for moving said toast holder about its fulcrum, a slide pivotally mounting said resilient member, and means for moving said slide to cause said resilient member to act on opposite sides of said fulcrum.

6. In a toaster, a toast holder, a fulcrumed lever for moving said toast holder to toasting and non-toasting positions, a slide movable relative to the fulcrum of said lever, a link pivotally mounted on said slide, a collar sleeved on said link and fixed to said lever, and a spring sleeved on said link and engaging said collar to urge said lever about its fulcrum.

7. In a toaster, a toast holder movable to toasting and non-toasting positions, a slide for actuating said toast holder, said slide being operable in one position to retain said toast holder in toasting position and being operable in another position to move said toast holder to non-toasting position, means for moving said slide to the first mentioned position and clockwork mechanism for slowly returning the said slide to the second mentioned position.

8. In a toaster, a fulcrumed toast holder, a member movable relative to the fulcrum of said toast holder, and resilient actuating means for said toast holder pivoted to said member, said means being operable to move said toast holder in either direction about its fulcrum dependent upon the position of the pivot point of said actuating means relative to the fulcrum of the toast holder.

9. In an electric toaster, a heating element, a pair of toast holders movable toward and away from said heating element, yieldable members connected to said toast holders and operable in one position to urge said toast holders toward said heating element and operable in a second position to urge said toast holders away from said heating element, a slide mounting said yieldable members, and means for moving said slide to move said yieldable members to either of said positions.

10. In an electric toaster, a toast holder movable to toasting and non-toasting positions, a slide, a connection between said slide and said toast holder operable in one position of said slide to urge said toast holder to toasting position and operable in a second position of said slide to urge said toast holder to non-toasting position, a clock work mechanism for moving said slide to said second mentioned position, and a common means for moving said slide to the first mentioned position and for setting said clock work mechanism.

11. In an electric toaster, a heating element, a pair of toast holders movable toward and away from said heating element, a slide mounted for vertical movement between said toast holders, connections between said slide and said toast holders operable in the depressed position of said slide to urge said toast holders toward said heating element and operable upon a predetermined upward movement of said slide to urge said toast holders away from said heating element, means for depressing said slide, and means for slowly returning said slide to its elevated position, said last mentioned means including a depending arm carried by said slide, a pivotally mounted bell crank lever having a portion arranged in the path of movement of said depending arm, and means for rocking said bell crank lever about its pivot to engage said arm and force the same upwardly.

12. In a toaster, a bell crank lever, actuating means therefor, a toast holder, and actuating means for the holder including a slide connected to the holder and operable by the bell crank lever and also operable independently thereof.

13. In a toaster, a bell crank lever, actuating means therefor, a toast holder, actuating means for the holder including a slide operable by the bell crank lever and also operable independently thereof, and a connection between the slide and holder operable when the slide is in one position relative to the holder to move the holder to operative position and operable when the slide is in another position relative to the holder to move the holder to inoperative position.

14. In a toaster, a toast holder, and actuating means therefor including a rock shaft, reciprocating means in a plane at substantially right angles to the rock shaft, a connection between the shaft and means including a spring operable when the connection is at one side of the rock shaft to move the holder to operative position and operable when the connection is upon the other side of the shaft to move the holder to inoperative position.

15. In a toaster, a shaft provided with a crank, a toast holder rigid with said shaft, a slide movable longitudinally in a plane at substantially right angles to the axis of the shaft, a rod connected to said slide and crank, and a coil spring associated with said rod and capable of raising and lowering the holder depending upon the position of the slide relative to said shaft.

In testimony whereof we affix our signatures.

FRANK KUHN.
LAURENCE H. THOMAS.